United States Patent
Akolkar et al.

(10) Patent No.: US 8,966,047 B2
(45) Date of Patent: Feb. 24, 2015

(54) MANAGING SERVICE SPECIFICATIONS AND THE DISCOVERY OF ASSOCIATED SERVICES

(71) Applicant: International Business Machines Corporation, Armonk, NY (US)

(72) Inventors: Rahul P. Akolkar, Tuckaahoe, NY (US); Arun Iyengar, Yorktown Heights, NY (US); Isabelle Rouvellou, New York, NY (US); Ignacio Silva-Lepe, Putnam Valley, NY (US); Revathi Subramanian, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/745,240

(22) Filed: Jan. 18, 2013

(65) Prior Publication Data

US 2014/0006582 A1    Jan. 2, 2014

Related U.S. Application Data

(63) Continuation of application No. 13/535,822, filed on Jun. 28, 2012, now abandoned.

(51) Int. Cl.
*G06F 15/173* (2006.01)
*H04L 12/24* (2006.01)
*G06Q 10/10* (2012.01)

(52) U.S. Cl.
CPC .............. *H04L 41/00* (2013.01); *G06Q 10/103* (2013.01)
USPC .......................................... 709/223; 709/225

(58) Field of Classification Search
USPC ......... 709/223, 217–219, 224–226, 227, 229, 709/230
See application file for complete search history.

(56) References Cited

U.S. PATENT DOCUMENTS

| 7,917,619 | B2 | 3/2011 | Ding | |
| 7,933,891 | B2 * | 4/2011 | Larkin et al. | 707/711 |
| 2002/0029256 | A1 * | 3/2002 | Zintel et al. | 709/218 |

(Continued)

FOREIGN PATENT DOCUMENTS

WO    03056407    7/2003

OTHER PUBLICATIONS

Non Final Office Action dated Feb. 13, 2014 received for U.S. Appl. No. 13/535,822.

*Primary Examiner* — Ruolei Zong
(74) *Attorney, Agent, or Firm* — Fleit Gibbons Gutman Bongini & Bianco PL; Thomas Grzesik

(57) ABSTRACT

Various embodiments manage service labels for association with service specifications in a service-oriented environment. In one embodiment at least one candidate service label is received from a user associated with a service domain of a distributed federated service-oriented environment. The candidate service label includes at least one of a service type and a set of terms characterizing a service. The candidate service label is sent to a community of users associated with one or more service domains in the distributed federated service-oriented environment. One of a vote for accepting the candidate service label and a vote for rejecting the candidate service label is received from each of a plurality of users in the community of users. The candidate service label is stored as an accepted service label in the service domain based on a number of votes for accepting the candidate service label being above a given threshold.

24 Claims, 10 Drawing Sheets

(56) References Cited

U.S. PATENT DOCUMENTS

| | | |
|---|---|---|
| 2007/0282879 A1* | 12/2007 | Degenkolb et al. ........... 707/101 |
| 2008/0147872 A1 | 6/2008 | Regnier |
| 2008/0215583 A1* | 9/2008 | Gunawardena et al. .......... 707/7 |
| 2009/0006897 A1* | 1/2009 | Sarsfield ........................ 714/38 |
| 2009/0248610 A1* | 10/2009 | Sigurbjornsson et al. ........ 707/1 |
| 2009/0327054 A1* | 12/2009 | Yao et al. ........................ 705/12 |
| 2010/0131193 A1* | 5/2010 | Shnyr ............................ 701/208 |
| 2011/0125561 A1* | 5/2011 | Marcus ..................... 705/14.15 |
| 2011/0138000 A1* | 6/2011 | Balasubramanian et al. 709/206 |

* cited by examiner

MANAGING SERVICE SPECIFICATIONS AND THE DISCOVERY OF ASSOCIATED SERVICES

CROSS-REFERENCE TO RELATED APPLICATIONS

This application is a continuation of and claims priority from U.S. patent application Ser. No. 13/535,822, filed on Jun. 28, 2012, the entire disclosure of which is herein incorporated by reference.

BACKGROUND

The present invention generally relates to service oriented architecture, and more particularly relates managing the creation and matching of service specifications and the discovery of services associated therewith.

Service Oriented Architecture (SOA) is a popular building block for open-standards based information technology (IT) today. In general, as is known in computing environments, SOA provides a set of governing concepts used during phases of system (e.g., application) development and integration. Such an architecture packages functionality as interoperable services. Software modules provided as a service can be integrated or used by several domains and/or enterprises, even if their respective client systems are substantially different. Further, it is known that, rather than defining an application programming interface (API), SOA defines the interface in terms of protocols and functionality. Still further, SOA separates functions into distinct units, or services, which developers make accessible over a network in order that users can combine and reuse them in the production of applications. These services communicate with each other by passing data from one service to another, or by coordinating an activity between two or more services.

In the context of intra- and inter-enterprise service connectivity, service domains can be defined that delimit the visibility and connectivity for collections of services and within which services can display Enterprise Service Bus (ESB) properties, including dynamic selection and location transparency. In many instances, service providers and consumers may reside in independent domains (distributed and autonomous). This can make matching services made available by the providers with service requests created by consumers a difficult task.

BRIEF SUMMARY

In one embodiment, a computer program storage product for managing service labels for association with service specifications in a service-oriented environment is disclosed. The computer program storage product comprises instructions configured to perform a method. The method comprises receiving at least one candidate service label from a user associated with a service domain of a distributed federated service-oriented environment. The candidate service label comprises at least one of a service type and a set of terms characterizing a service. The candidate service label is sent/transmitted to a community of users associated with one or more service domains in the distributed federated service-oriented environment. One of a vote for accepting the candidate service label and a vote for rejecting the candidate service label is received from each of a plurality of users in the community of users based on the sending. The candidate service label is stored as an accepted service label in the service domain based on a number of votes for accepting the candidate service label being above a given threshold. Alternatively, the candidate service label is rejected based on a number of votes for rejecting the candidate service label being above a given threshold.

In another one embodiment, a computer program storage product for matching service specifications in a service-oriented environment is disclosed. The method comprises analyzing a registry of service specifications. A first set of service specifications associated with requested services and a second set of service specifications associated with available services are identified based on the analyzing. Each service specification in the first and second sets of service specifications comprises a service label. Information within each of the service labels has been previously agreed upon by two or more users in a community of users. Each service label comprises at least one of a service type and a set of terms characterizing a service. The service labels of the first set of service specifications are compared with the service labels of the second set of service specifications. At least one service specification in the first set of service specifications that matches at least one service specification in the second set of service specifications is identified based on comparing the services labels thereof.

In yet another embodiment, a computer program storage product for discovering services in a service-oriented environment is disclosed. The method comprises receiving, from a user in a community of users, a request for a service, wherein the request comprises a first service specification. At least a second service specification is identified from a registry of service specifications. The second service specification is associated with at least one available service. The first service specification comprises a first service label and the second service specification comprises a second service label. Information within each of the first and second service labels has been previously agreed upon by two or more users in the community of users. The first and second service labels each comprise at least one of a service type and a set of terms associated characterizing a service. The first service label is compared with the second service label. The first service label is determined to match the second service label based on the comparing. The request is satisfied with the available service associated with the second service specification.

In another embodiment, a system for managing service labels for association with service specifications in a service-oriented environment is disclosed. The computer system comprises a memory and a processor communicatively coupled to the process. A service label manager is communicatively coupled to the memory and the processor. The service label manager is configured to perform a method. The method comprises receiving at least one candidate service label from a user associated with a service domain of a distributed federated service-oriented environment. The candidate service label comprises at least one of a service type and a set of terms characterizing a service. The candidate service label is sent/transmitted to a community of users associated with one or more service domains in the distributed federated service-oriented environment. One of a vote for accepting the candidate service label and a vote for rejecting the candidate service label is received from each of a plurality of users in the community of users based on the sending. The candidate service label is stored as an accepted service label in the service domain based on a number of votes for accepting the candidate service label being above a given threshold.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
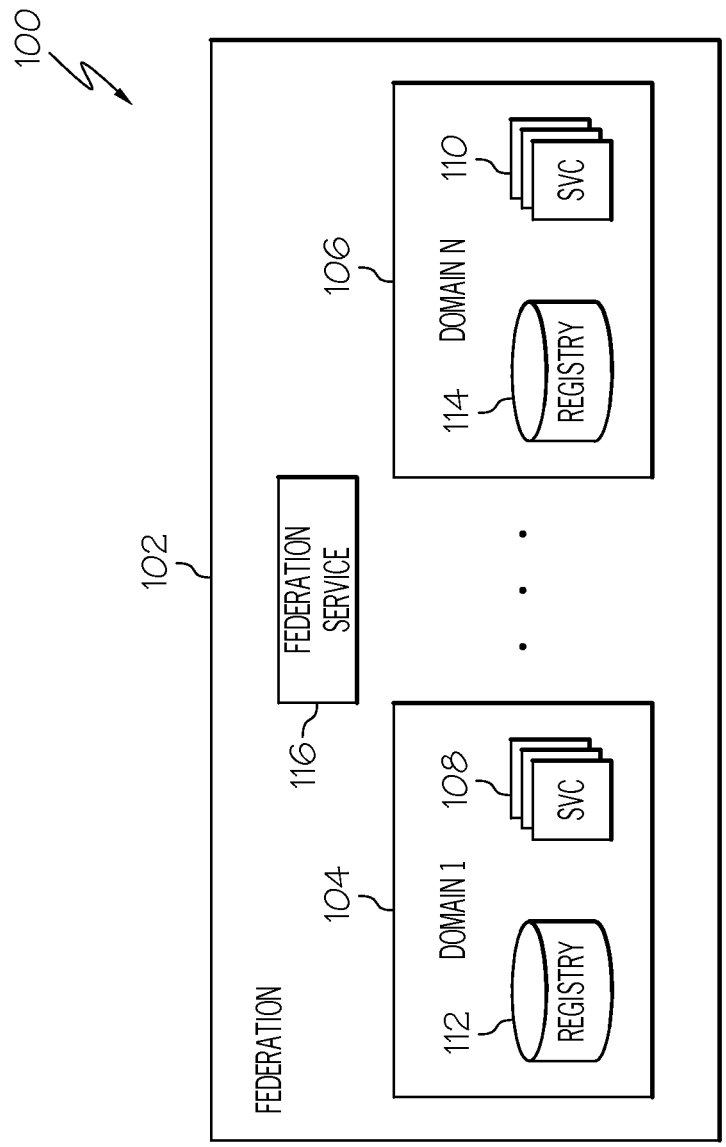
FIG. 1 is a block diagram illustrating one example of an operating environment according to one embodiment of the present invention.

FIG. 1 illustrates a general overview of one operating environment 100 according to one embodiment of the present invention. In particular, FIG. 1 a federation 102 that aggregates any number of service domains 104, 106 (e.g., domains 1 . . . n, where n is an integer greater than one). A service domain 104, 106 defines a scope for the management for any number of services 108, 110. Stated differently, a service domain 104, 106 delimits the visibility and connectivity of any number of services 108, 110. A service domain 104, 106 relies on a service registry 112, 114 to keep track of the services it manages. A federation 104, in one embodiment, also includes a federation service 116 that maintains a record of the collection of service domains in the federation 104.

Figure 2:
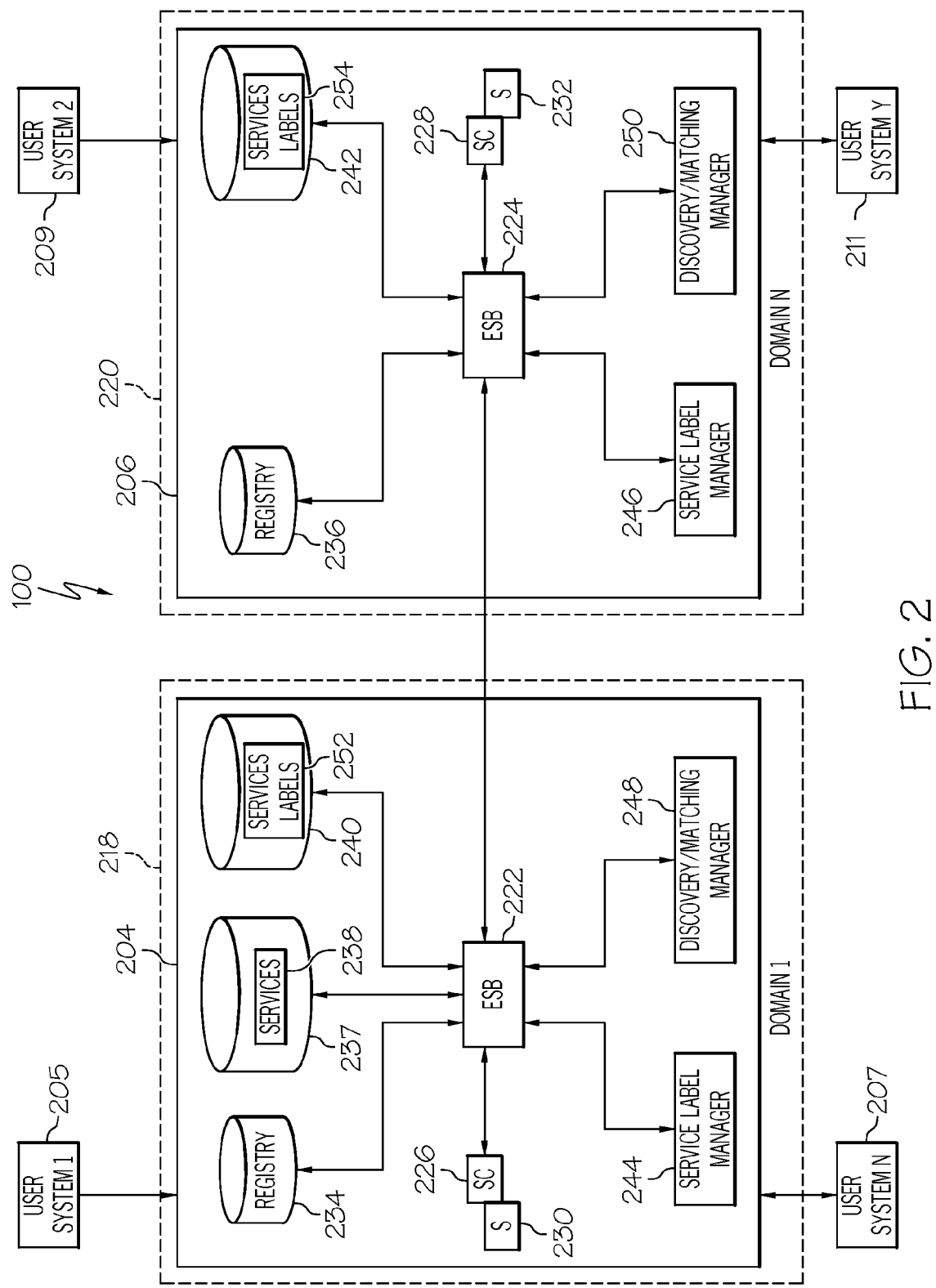
FIG. 2 is a block diagram illustrating a more detailed view of the operating environment of FIG. 1 according to one embodiment of the present invention.

FIG. 2 shows a more detailed view of the operating environment 100 according to one embodiment of the present invention. In particular, FIG. 2 shows Domain 1 204 and Domain N 206 as being distributed across multiple computing devices such as multiple severs via a network, and for conciseness Domain 1 204 is depicted in server 218 and Domain N 206 is depicted in server 220. In one embodiment, Domain 1 204 and Domain N 206 are realized by one or more instances of an Enterprise Service Bus (ESB) 222, 224. An ESB is a software infrastructure that facilitates application integration. In SOA architecture, ESBs are the switching centers within a service domain that enable service interaction across technological boundaries by using service mediations and service proxies. One or more embodiments provide cross-domain service integration through an automated federation of ESBs. An ESB is realized in terms of any number of instances of a service container 226, 228, which provides the necessary infrastructure for a service 230 to interact with other services 232. A service container 226, 228 provides interface abstraction, destination abstraction and data abstraction that result in properties such as dynamic selection and location transparency to be available to services. A service container 226, 228 uses a service registry 234, 236, given by its ESB, to perform its interface, destination and data abstraction functions.

In one embodiment, a global directory 237 maintains all services 238 available across all domains 204, 206. However, in another embodiment, one or more directories can exist across one or more domains and/or a directory can exist for different types of services such as financial services, data analysis services, data storage services, etc. Directories or directory agents can optionally store usage information about services. This usage information can include how frequently the service is invoked and client feedback on the services. This information can be used to rank the services as well as provide input to the standardization process, and determine which types of services are in the most demand. In order to federate services 238 across domains 204, 206, services 238 are made visible at the domains where the client applications use the services. For example, an administrator may desire a client application in a first domain 204 to utilize one or more services of a second domain 206. The client application can be representative of numerous applications that access a service, such as user applications on a user device, another service, etc. To federate (integrate) domains, services have to be made visible where the client application uses the services. A service may be made visible at one domain 204, 206 by introducing a service specification/description 302 (FIG. 3) in the registry 234, 236 of that domain 204, 206. For example, a service can be made visible at a first domain 204 by introducing a service specification 302 of the service in the registry 234 of the first domain 204. A service specification 302, in one embodiment, includes a name, zero or more parameter types and description of the functionality provided by the service 238, as well as any specific information 303, 305 pertaining to a service requester or provider, such as quality of service parameters, or protocol binding. One example of a structure for a specification/description 302 is a Web Services Description Language (WSDL) file. However, other data structures are applicable as well. The information within a service specification 340 is referred to as a service definition.

To allow services to communicate with another service in a separate domain, a service proxy (not shown) is included (but not required) in the local domain (e.g., Domain 1 204) to provide a local implementation of the foreign (non-local or remote) service, in this case, service 232 in Domain N 206. A service proxy is an element used between a client application and a service to enable connectivity between them. Proxies, like services, need to be made visible for applications to use them. In particular, a service proxy embodies the necessary logic to support connectivity with an ESB in a foreign domain.

A client can perform service discovery, which is an explicit search to discover services. For example, a client can explicitly search for services using keywords or other aspects of the service specification 340 stored in the registry 234. A client can bind to or use such a discovered service right away. Alternatively, service matching can be performed to facilitate a match between a service 238 that provides a given functionality and a client that has expressed interest for that functionality.

Service matching is performed by an automated mechanism that matches a client's required service specification 302 with an available service 238. This allows for clients and servers to broadcast their interest and/or availability, and for a service matchmaking agent to bind a client to the appropriate service when a "match" is established. In one embodiment, an interest and availability protocol is utilized to perform the service matching process. One example of interest and availability protocol is given in the commonly owned and co-pending U.S. application Ser. No. 12/625,806 entitled "Method and System for Matching Interest and Availability of Services in Distributed Federated Service Domains", which is hereby incorporated by reference in its entirety.

However, a problem exists with how clients can discover or be matched with the required services. For example, service providers and consumers may reside in independent domains (distributed and autonomous). Therefore, interest and availability of services are defined independently. This can lead to problems when attempting to match interest and availability of services. Also, every service is identified by a service specification. In the case of explicit service discovery, a client can find required services by browsing/searching service specifications. In the case of service matching, the requirement of a service S1 may be fulfilled by matching its service specification against the specification of an available service S2. Service definition information cannot be assumed to be widely available across a distributed, service oriented environment, either by distributed replication or by maintaining a centralized registry. In addition, service providers and requesters cannot assume that service definition information conforms to commonly agreed-to vocabularies of terms. In the absence of common service definition information, service discovery and service matching become very difficult tasks.

Therefore, one or more of the service domains 204, 206, comprise a dictionary of service labels (DSL) 240/242, a service label manager 244/246, and/or a service specification matching/discovery manager 258/250. These components enable service discovery and service specification matching using service labels. For example, the service label manager 244 manages the creation, deletion, and modification of the service labels 252 as well as the replication of service labels 252 to other domains. The service label manager 244 also manages consensus operations and activities for the service labels 252. The matching/discovery manager 248 manages the searching and discovery of specifications 302 (and services 238) based on the service labels 252. It should be noted that even though FIG. 2 shows the service label manager 244 and matching/discovery manager 248 as being separate components they can also reside within the same component as well. Also, one or more of the service label manager 244 and matching/discovery manager 248 can reside within another component of a domain as well. Each of the service label manager 244 and matching/discovery manager 248 is discussed in greater detail below.

Service labels 252 are stored within a DSL 240. As will be discussed in greater detail below, a service label manager 244 replicates one or more service labels 252 (or entire DSL 240) to one or more other domains. In one embodiment, a service label comprises minimal service definition information. Therefore, the DSL 240 can be one or more orders of magnitude smaller than the corresponding container 226, 228 of service definition information in a given distributed service oriented environment. Also, with a minimal amount of service definition information, agreement on a particular service label becomes more traceable. This allows the contents of the DSL 240 to be agreed upon and maintained by distributed consensus and replication. Distributing/replicating a DSL 240 across domains allows for greater autonomy and dynamic federation membership to domains. Also, the maintenance of the replicas, as well as the voting procedures for adding, removing and updating service labels from the distributed DSL are performed via suitable distributed algorithms.

Figure 3:
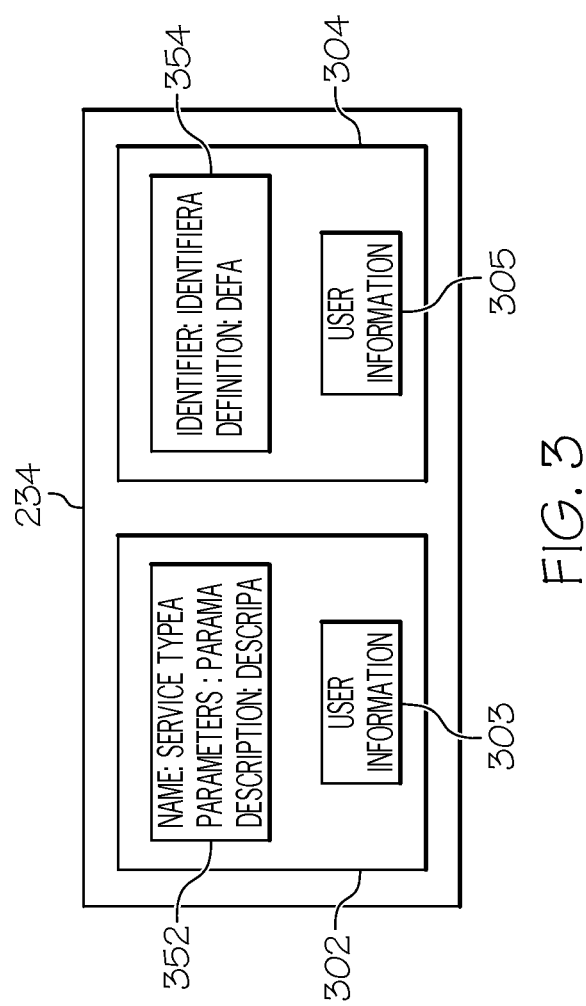
FIG. 3 is a block diagram illustrating service specifications comprising service labels according to one embodiment of the present invention.

A service label 252, in one embodiment, is used to create a service specification 302 as shown in FIG. 3. For example, a service requestor utilizes a service label 352 to create a service specification 302 comprising the service label 352, as shown in FIG. 3. A service specification 302 can be a requested/required service specification characterizing a service requested by the user. A service specification 304 can also be an available service specification characterizing an available service 238 provided by the service provider who created the specification. As discussed above, the service specifications 302, 304 are stored within the service specification registry 234 of the domain.

A service label 252, in one embodiment, is either a common/accepted service type or a common/accepted term. Here, the qualifier "common" denotes that either form of the service label 252 is obtained by consensus (an agreement) amongst a community of users. Stated differently, one or more embodiments of the present invention enable one or more service labels 252 to be defined by consensus across a community of service users. A community refers to the federation of service domains and the service users/providers within those domains. For example, FIG. 2 shows a plurality of user systems 205, 207, 209, 211 being communicatively coupled to each of the domains 204, 206. Two or more of these user systems 205, 207, 209, 211 are considered a community of service users. It should be noted that different communities can exist within the federation. For example, there may be a financial community, a technical community, a medical community, etc.

A common service type includes a name, zero or more parameter types, and description of the functionality provided by the service, as shown in service label 352 of FIG. 3. A common term includes an identifier and definition, as shown in service label 354 of FIG. 3. As an example of a common service type, a community can define a common service type of name "StockQuote" with parameters "Symbol" and "PriceUSD" with a description of "a stock quote service that takes a parameter in the form of a text string representing a stock symbol such as "IBM" and returns a parameter in the form of a real number representing the latest value of IBM stock". Common terms can be used to aid service discovery in addition to common service types or when an applicable common service type does not exist.

As an example of the use of common terms, suppose that a common service type does not exist in a community for providing stock quotes. However, there is a well-defined vocabulary in the financial community where the common term "StockQuote" is the value of a stock. The common term "Symbol" is a text string representing a stock symbol and the common term "PriceUSD" is a decimal number representing a price in US dollars and cents. A client uses this knowledge of the common terms to perform a search for any instantiations of a service called StockQuote which takes a parameter of type Symbol and returns a value of type PriceUSD. Based on the clear definitions for these terms, the client can make a reasonable assumption about what such a service does.

The common service type of a service label 252 can also be used by a service provider to advertise a service. For example, a service provider, which has at least one implementation of the StockQuote common service type, can advertise the availability of the one or more services to clients. A client interested in a StockQuote service can then invoke one of the advertised services. A service provider can similar advertise a service using common terms of a service label as well. In this example, a client is able be able to determine what the service does based on the service name, input parameter, and output parameter of the service label.

Figure 4:
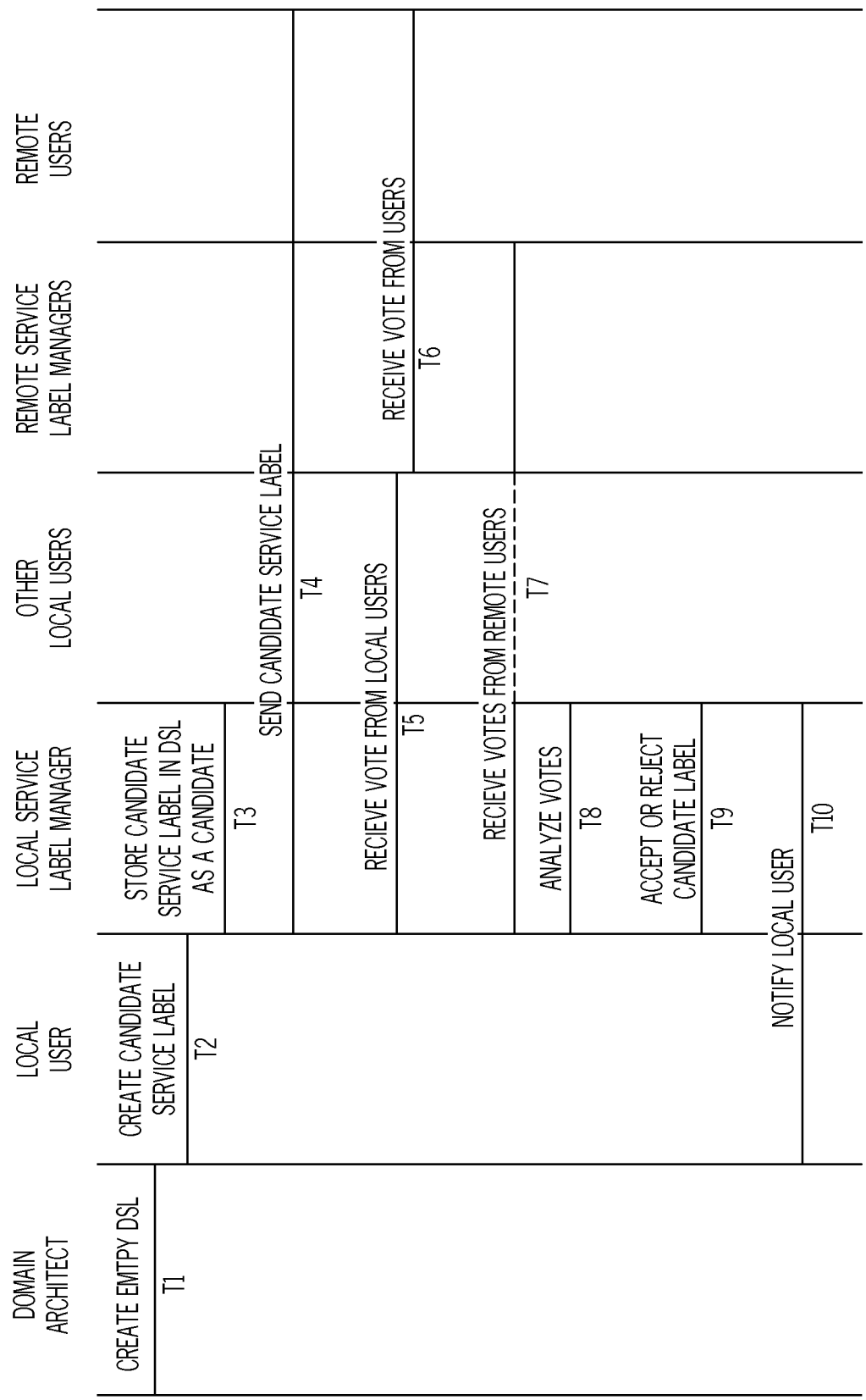
FIG. 4 is a transactional diagram illustrating one example of populating and replicating a dictionary of service labels according to one embodiment of the present invention.

FIG. 4 is a transactional diagram illustrating one example of populating and replicating a DSL 240. When the federation 102 is initialized an empty dictionary is created for at least one domain 204, at T1. At least one local user at a user system 205 of the domain 204 comprising the DSL 240 proposes a candidate service label to be added to the DSL 240, at T2. In this example, the local user is part of a financial community and proposes a candidate service label using a term "StockQuote" and a definition of "StockQuote is the value of a stock". The local service label manager 244 stores the candidate service label in the DSL 240 as a candidate, at T3. It should be noted that candidate service labels can be displayed as available service labels to users searching the DSL 240 for applicable labels when creating a service specification. The local service label manager 244 sends the candidate service label (e.g., using a distributed consensus protocol) to other service users in the same community as the local user, at T4. In the current example, the candidate service label is based on the StockQuote. Therefore, the local service label manager 244 sends the identifier "StockQuote" and its definition "StockQuote is the value of a stock" to the other users. If the candidate service label is a service type, the local service label manager 244 sends the name of the service type, any parameter types, and the description of the functionality provided by the associated service.

In one embodiment, the other community users can be within the same domain 204 (e.g., local users) as the local user and/or within a different domain (e.g., remote users). In one embodiment, local service label manager 244 maintains a set of information that identifies users within a community that are connected to the domain 204 of the local service label manager 244. This information can be updated each time a user connects/disconnects from the domain 204. The local service label manager 244 also sends the candidate service label to the other service label managers 246 in the other domains 206 (e.g., remote service label managers). These remote service label managers 246 send the candidate service label to any users in the community of the user who created the candidate service label. The service label managers 244, 246 can utilize a variety of methods to transmit the candidate service label to users in a community and/or to other service label managers including but not limited to unicast methods and/or multicast methods.

When the service label managers 244, 246 send the candidate service label to the users, they prompt the users to vote on the candidate service label. For example, users can indicate whether they are in favor of accepting the candidate label, are against the candidate label (i.e., vote for rejecting the label), or abstain from voting. The service label manager 244, 246 associated with each voting user receives each vote, at T5 and T6. Any remote service label managers 246 that have received votes from their users send the votes to the local service manager 244, at T7. The local service manager 244 analyzes the votes and determines if a voting threshold has been reached, at T8. For example, the local service manager 244 determines if the number of votes in favor of the candidate label or against the candidate label or equal to or greater than a given threshold. One example of a threshold is requiring the votes in favor of accepting the candidate label to be greater than the votes in favor of rejecting the candidate label. If the majority of the votes are in favor of the candidate label the local service label manager 244 accepts this label as agreed upon by the community and adds this label to the DSL 240 as an accepted service label, at T9. If the majority of the votes are against of the label the local service label manager 244 rejects this label, at T9. The local service label manager 244 then notifies the local user of the acceptance or rejection of his/her candidate service label, at T10. The local user can make changes to the candidate label, remove the candidate label from the DSL 240, or perform another action. In one embodiment, the local service label manager 244 can automatically remove the label from the DSL 240. In another embodiment, the other users can submit requested/suggested modifications to the labels along with their votes. These changes can be then be made by the local user and the modified label can be sent out for additional votes. It should also be noted that the local service manager 244 can wait a given period of time to allow sufficient time for votes to be submitted prior to making a final decision as to whether to reject or accept a candidate label.

The above process is performed for each service label that is proposed by a user. As each accepted service label is stored in the DSL 240 of a domain 204, the local service label manager 244 of that domain replicates the contents of its DSL 240 to other DSLs 246 in other domains. For example, the local service label manager 244 sends each accepted service label to the other service label managers 246, which store the received service labels in their DSLs 242. In another embodiment, the local service label manager 233 sends accepted service labels to other service label managers 246 for replication after a given number of accepted service labels have been stored in the local DSL 240. In a further embodiment, each service label manager 244, 246 stores candidate service labels received from other service label managers as part of the voting process in their DSLs 240, 242. In this embodiment, if a local service label manager 244 rejects a candidate label it notifies the other service label managers 246 of the rejection. These other managers 246 then remove the candidate labels from their DSLs 242. Also, as domains join the federation, the users of that domain are considered to have agreed upon labels within the local DSL 240, 242 if they do not contest a service label within a given amount of time. Alternatively, users can contest a service label at any point in time after joining a domain.

A similar process as that shown in FIG. 4 can be performed when contesting a service label in a DSL 240, 242. For example, a user can decide that a given service label in the DSL 240 of his/her domain 204 is no longer suitable for a service specification. Therefore, this user can dispute the existence of the service label in the DSL 240 and a voting procedure is initiated amongst the community to remove the label from the DSL 240. When a given number of votes is collected from the community and a given majority of votes exist for removing the service label the service label manager removes the label from the DSL 240. The service label manager 240 then notifies each of the other service label managers 246 to remove the service label from their DSLs 242.

Even further, users can modify/update a service label in a DSL 240 using a process similar to that of FIG. 4. For example, a user can determine that an update to a given service label in the DSL 240 of his/her domain is required to make the service label more suitable for service specifications. The user can modify the service label accordingly in the DSL 240 and a voting procedure is initiated amongst the community to accept the update. When enough votes are collected from the community and a given majority of votes for accepting the update exist, the service label manger 244 is updated within the DSL 240 according to the agreed upon update. The service manger 244 then notifies each of the other service label managers 246 to update the service label in their DSLs 246 based on the agreed upon update. In one embodiment, the local service manager 244 sends the update along with the notification to the other service label managers 246. In another embodiment, the other service label managers 246 maintain a copy of the update during the voting procedure and apply their local copy of the update once the update notification is received from the local service manager 244. It should be noted that, in one embodiment, the service label is marked as a candidate label in the DSLs during the voting procedure. However, this is not required.

As can be seen, a DSL 240 is dynamic since it is built concurrently with its use, where the developers of the DSL 240 are also its users. Service labels are agreed upon before they are used and are able to dynamically be created as they are needed. As discussed above, the service labels 252 within the DSL 240 can be utilized by the users to create service specifications 302 such as required service specifications and available service specifications. Each of these specifications 302 are stored within the registry 234 of a domain 204. Required service specifications are created by users requesting a service and describe/characterize the service being requested by the user. Available service specifications are created by service providers and describe/characterize the services made available by the service providers. For example, a user that is requesting a stock quote service searches through the DSL via a user interface (not shown) and identifies a service label in the DSL that describes/characterizes the type of service, e.g., stock quote service, the user requires. The user creates a required service specification that includes the identified service label (e.g., a common term and/or a common type) and also information associated with the user such as, but not limited to, quality of service (QoS) parameters, protocol binding, supporting credentials, etc.

The same process applies to a service provider creating an available service specification. For example, a service provider that is providing a stock quote service searches through the DSL via a user interface and identifies a service label in the DSL that describes/characterizes the type of service, e.g., stock quote service, the provider is providing requires. The service provider creates an available service specification that includes the identified service label (e.g., a common term and/or a common type) and also information associated with the user such as, but not limited to, quality of service (QoS) parameters, protocol binding, supporting credentials, etc. In addition, an available service specification can also comprises an identifier, flag, pointer, or some other mechanism that allows the service label manager 244 to map a service specification to its associated service 238 stored within the service directory 237.

The discovery/matching manager 248 utilizes the service labels within the specifications to perform service discovery and/or service specification matching operations. Service discovery operations explicitly search and find services requested by a user. For example, a user can submit a request for services to the discovery/matching manager 248. This request, in one embodiment, comprises the service specification created by the user characterizing the requested service. The discovery/matching manager 248 compares the service label of a user's required service specification with the available service specifications associated with provided services. This comparison process can include structural and/or syntactic comparison of the common service type and/or common terms within each of the service labels. For example, the text strings comprising all or parts of the service labels can be compared. Another example of a comparison process is to parse the service specification into tokens and compare token types. This can be done with one or more parameters associated with the services. It should be noted that other comparison methods are applicable as well.

The discovery/matching manager 248 determines that an available service satisfies a user's service request if the service labels in the service specifications match. For example, two or more services labels are considered to match if the common terms and/or common types are equal. In this embodiment, if the discovery/matching manager 248 is comparing common terms, the service labels can be identified as matching if the identifiers and/or definitions of the common terms match. A text string comparison process (or another process) can be performed to determine if the text strings of the identifiers match at least within a given equality threshold or if the text within the descriptions match at least within a given threshold. If the discovery/matching manager 248 is comparing common types, the service labels can be identified as matching if the structural and/or syntactic characteristics of the names, parameter types, and/or description of the common type match at least within a given equality threshold. These items are considered equal according to a given definition of label equality. Examples of equality include identifying service labels as equal if they are identical, if they take identical parameter types, and/or if text descriptions of the services are similar, but not necessarily identical and they take identical parameter types. However, other definitions of equality are applicable as well.

Figure 5:
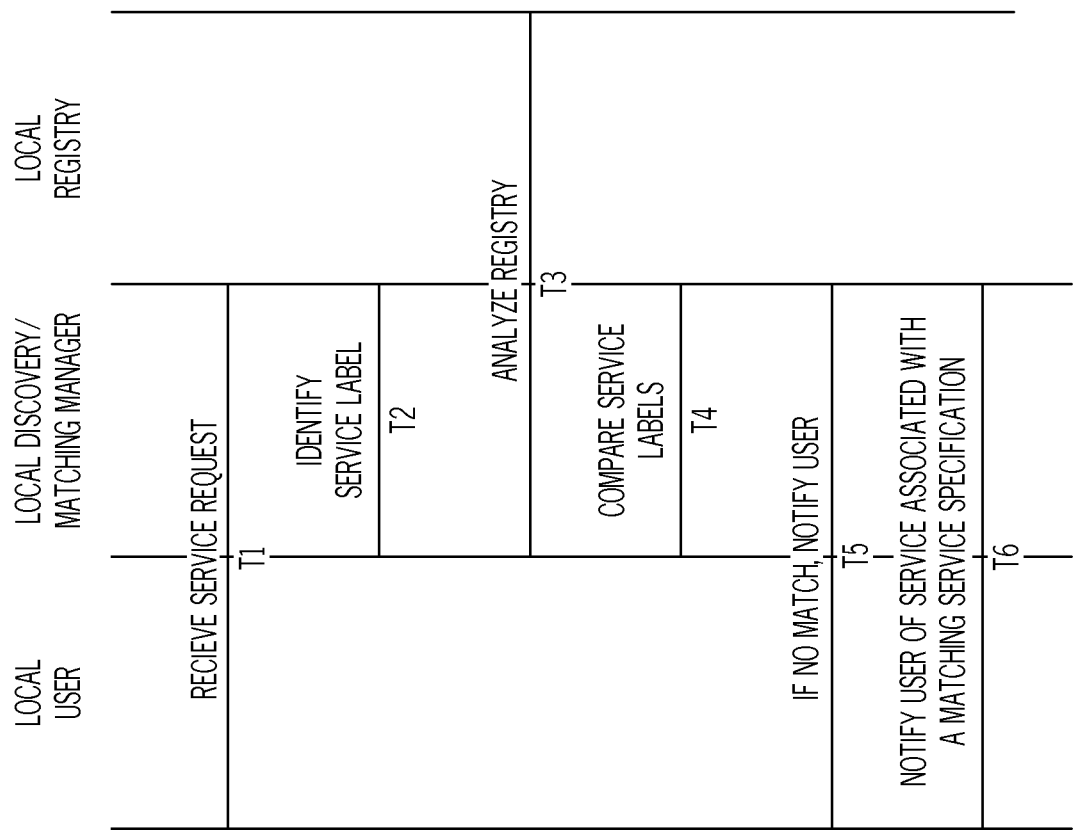
FIG. 5 is a transactional diagram illustrating one example of performing service discovery according to one embodiment of the present invention.

FIG. 5 is a transactional diagram illustrating one example of performing service discovery. The discovery/matching manager 248 receives a request from a user for a service, at T1. This request comprises a service specification created by the user. The discovery/matching manager 248 analyzes the service specification and identifies the service label therein, at T2. The discovery/matching manager 248 analyzes the registry 234 to identify each available service specification, at T3. The discovery/matching manager 248 compares the service labels of each of the available service specifications to the service label associated with the user's service request, at T4. For example, the discovery/matching manager 248 performs a structural and/or syntactic comparison of the names, parameter types, and/or descriptions of the labels. Alternatively (or in addition to), the discovery/matching manager 248 can also perform a text string comparison of the labels' common terms. These comparison processes indicate whether or not these components match each other at least within a given equality threshold. If none of the available service specifications comprise matching labels, the discovery/matching manager 248 informs the user, at T5. If one or more available service specifications comprise a matching label the discovery/matching manager 248 notifies the user of each service associated with a matching service specification, at T6.

Figure 6:
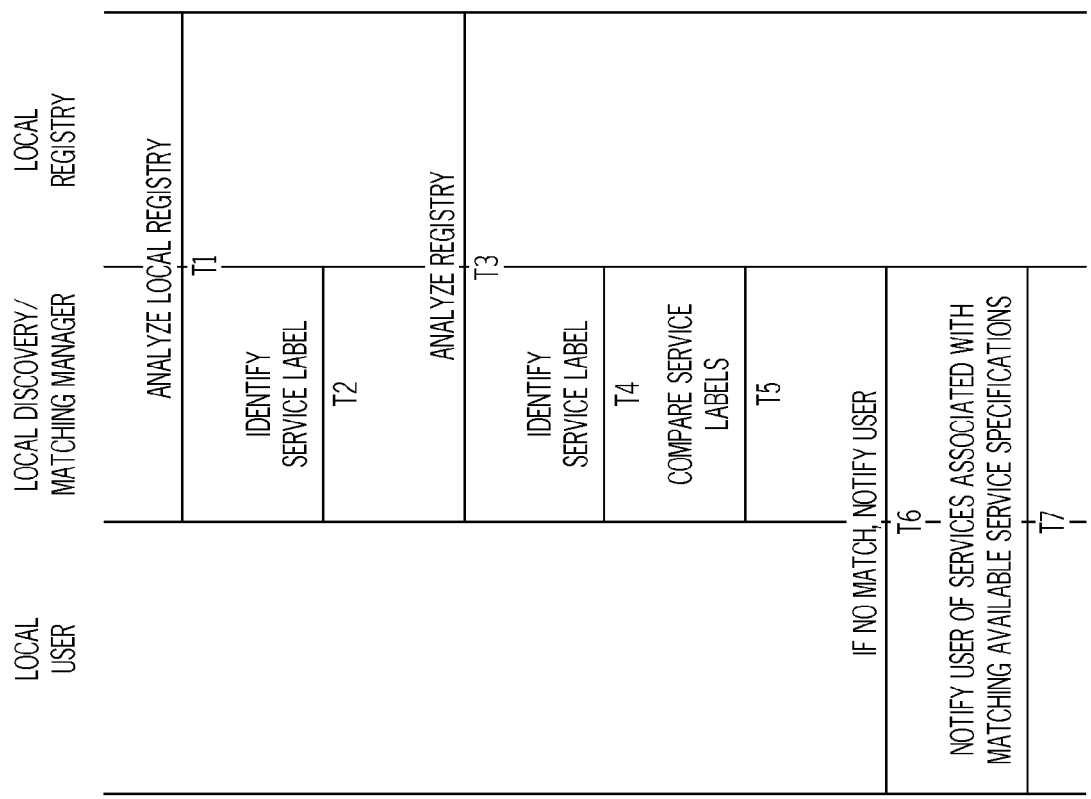
FIG. 6 is a transactional diagram illustrating one example of performing service matching according to one embodiment of the present invention.

The discovery/matching manager 248 performs service specification matching by matches a client's required service specification 302 with an available service 238. This allows for clients and servers to broadcast their interest and/or availability, and for a service matchmaking agent to bind a client to the appropriate service when a "match" is established. FIG. 6 is a transactional diagram illustrating one example of performing service matching. The discovery/matching manager 248 analyzes its local registry 234 to identify required service specifications created by users requesting services, at T1. The discovery/matching manager 248 analyzes each required service specification to identify their service labels, at T2. The discovery/matching manager 248 analyzes the registry 234 to identify each available service specification created by a service provider, at T3. The discovery/matching manager 248 analyzes each available service specification to identify their service labels, at T4. The discovery/matching manager 248 compares the service labels of each of the available service specifications to the service label of each required service specification, at T5. The discovery/matching manager 248 then determines if any of the service labels of the available service specification match the service label of any required service specification, at least within a given equality threshold. If none of the available service specifications comprise matching labels, the discovery/matching manager 248 informs the user, at T6. If one or more of the available service specifications comprise matching labels, the discovery/matching manager 248 notifies the user who created the required service specification (i.e., indicated an interest) of the services associated with the matching availability specifications, at T7.

As can be seen, one or more embodiments of the present invention are advantageous because the service users and service providers can create their specifications independent of each other using service labels. These service labels are defined by a consensus of community users. The community users agree on common service types and common terms. Different communities can agree on different sets of common service types and common terms. The use of common service types and terms makes it possible for a client to easily search for instantiations of those service types, which is a significant advantage to service discovery and matching. A client is able to identify all services that are available without requiring a single centralized registry, or a centralized federation manager that establishes bridges across domains for making services visible.

Figure 7:
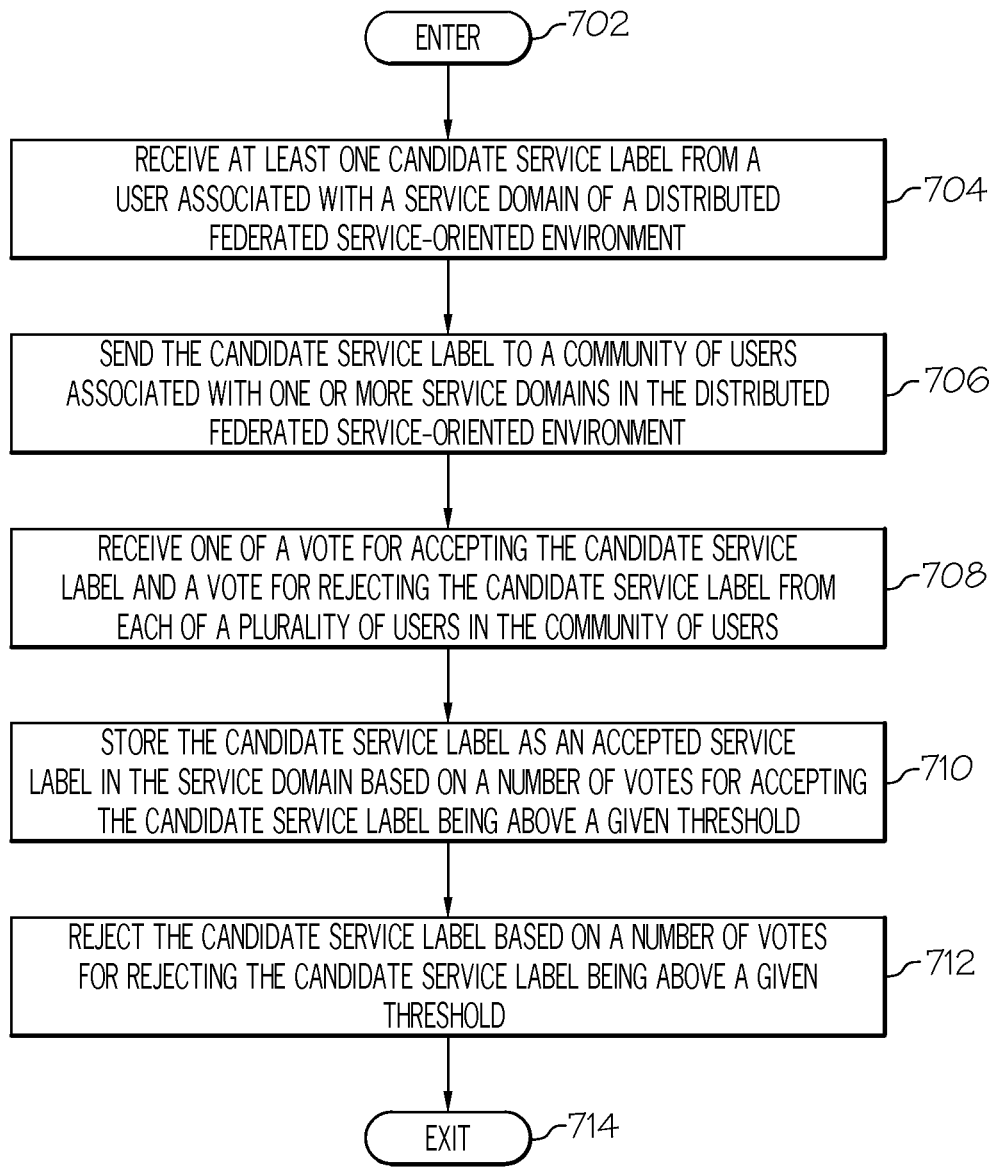
FIG. 7 is an operational flow diagram illustrating one example of managing service labels for association with service specifications in a service-oriented environment according to one embodiment of the present invention.

FIG. 7 is an operational flow diagram illustrating one example of managing service labels for association with service specifications in a service-oriented environment. The operational flow diagram of FIG. 7 begins at step 702 and flows directly to step 704. The service label manager 244, at step 704, receives at least one candidate service label from a user associated with a service domain of a distributed federated service-oriented environment. The candidate service label comprises at least one of a service type and a set of terms characterizing a service. The service label manager 244, at step 706, sends the candidate service label to a community of users associated with one or more service domains in the distributed federated service-oriented environment. The service label manager 244, at step 708, receives, based on the sending, one of a vote for accepting the candidate service label and a vote for rejecting the candidate service label from each of a plurality of users in the community of users. The service label manager 244, at step 710, stores the candidate service label as an accepted service label in the service domain based on a number of votes for accepting the candidate service label being above a given threshold. The service label manager 244, at step 712, rejects the candidate service label based on a number of votes for rejecting the candidate service label being above a given threshold. The control flow then exits at step 714.

Figure 8:
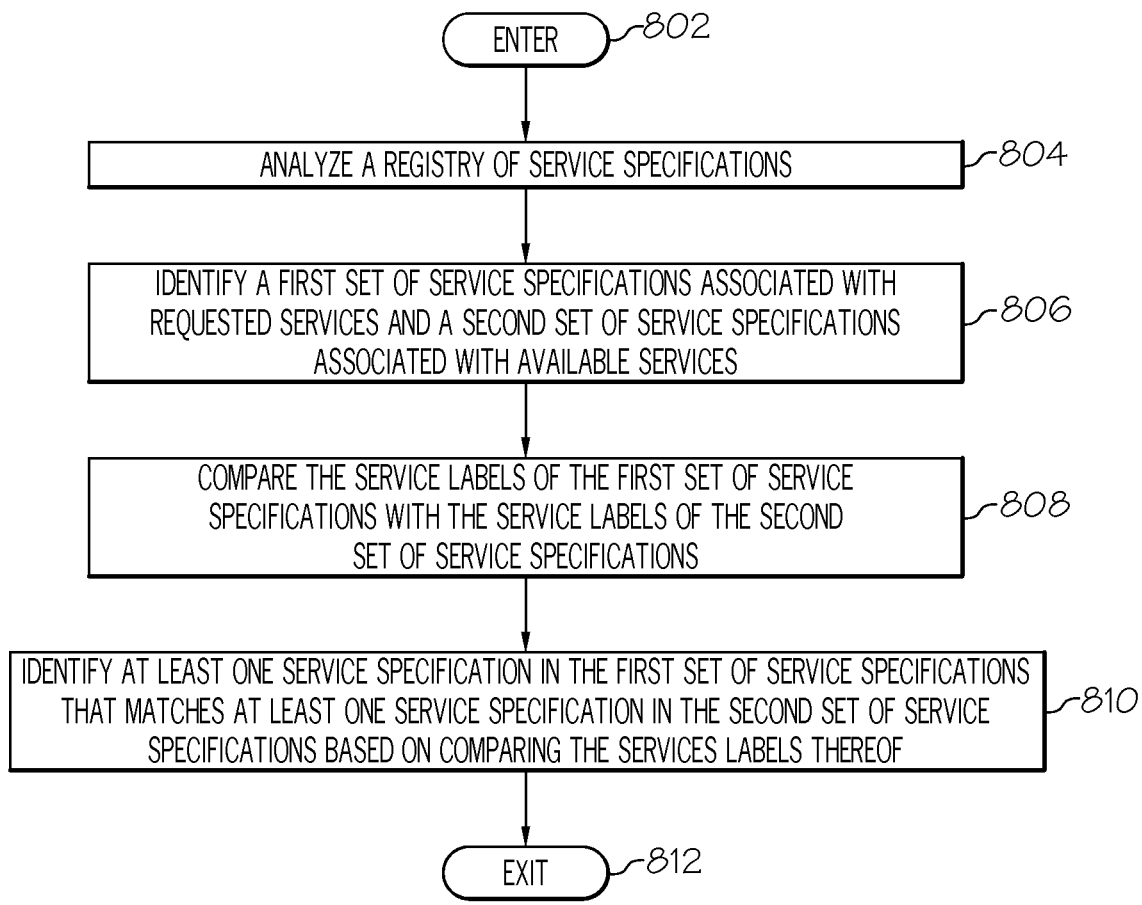
FIG. 8 is an operational flow diagram illustrating one example of matching service specifications in a service-oriented environment matching service specifications in a service-oriented environment according to one embodiment of the present invention.

FIG. 8 is an operational flow diagram illustrating one example of matching service specifications in a service-oriented environment. The operational flow diagram of FIG. 8 begins at step 802 and flows directly to step 804. The discovery/matching manager 248, at step 804, analyzes a registry 234 of service specifications. The discovery/matching manager 248, at step 806, identifies, based on the analyzing, a first set of service specifications associated with requested services, and a second set of service specifications associated with available services. Each service specification in the first and second sets of service specifications comprises a service label. Information within each of the service labels has been previously agreed upon by two or more users in a community of users. Also, each service label comprises at least one of a service type and a set of terms characterizing a service. The discovery/matching manager 248, at step 808, compares the service labels of the first set of service specifications with the service labels of the second set of service specifications. The discovery/matching manager 248, at step 810, identifies at least one service specification in the first set of service specifications that matches at least one service specification in the second set of service specifications based on comparing the services labels thereof. The control flow then exits at step 812.

Figure 9:
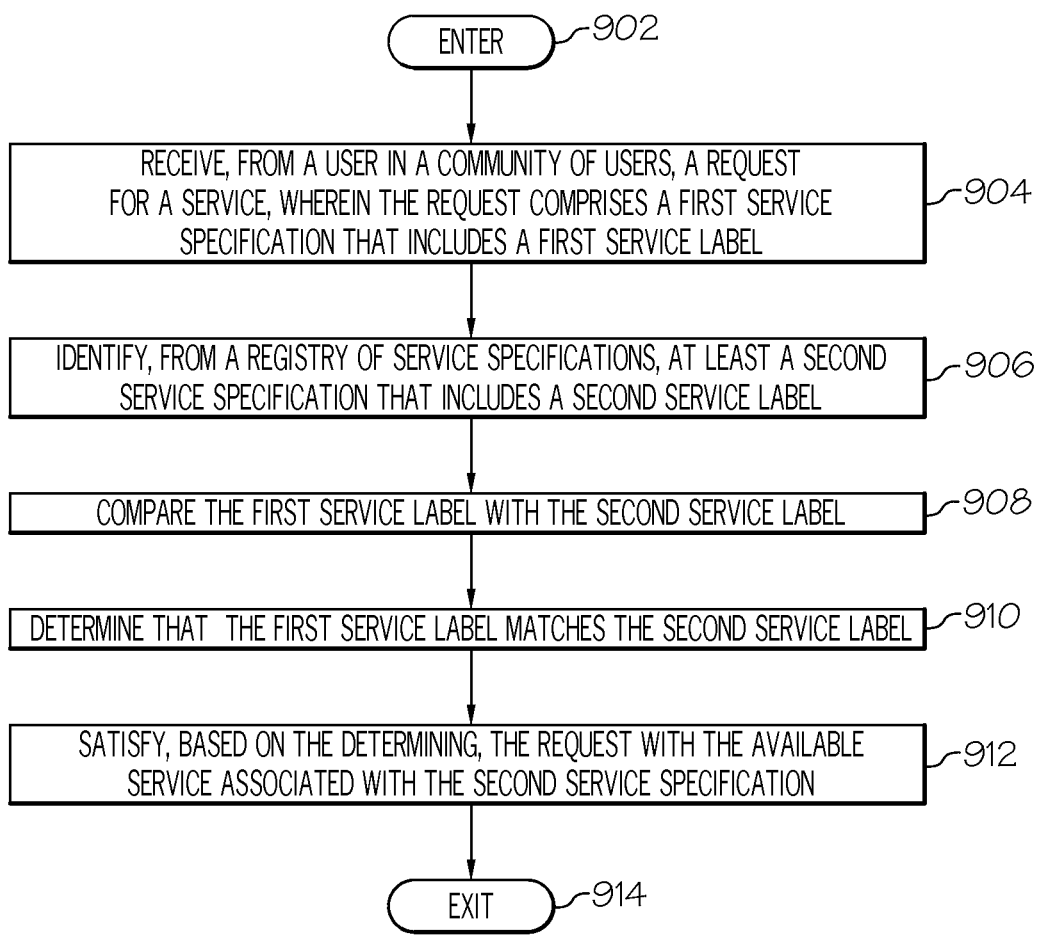
FIG. 9 is an operational flow diagram illustrating one example of discovering services in a service-oriented environment according to one embodiment of the present invention.

FIG. 9 is an operational flow diagram illustrating one example of matching service labels. The operational flow diagram of FIG. 9 begins at step 902 and flows directly to step 904. The discovery/matching manager 248, at step 904, receives, from a user in a community of users, a request for a service. The request comprises a first service specification. The discovery/matching manager 248, at step 906, identifies, from a registry of service specifications, at least a second service specification. The second service specification is associated with at least one available service. The first service specification comprises a first service label and the second service specification comprises a second service label. Information within each of the first and second service labels has been previously agreed upon by two or more users in the community of users. Also, each of the first and second service labels comprises at least one of a service type and a set of terms associated characterizing a service. The discovery/matching manager 248, at step 908, compares the first service label with the second service label. The discovery/matching manager 248, at step 910, determines, based on the comparing, that the first service label matches the second service label. The discovery/matching manager 248, at step 912, satisfies the request with the available service associated with the second service specification. The control flow then exits at step 914.

Figure 10:
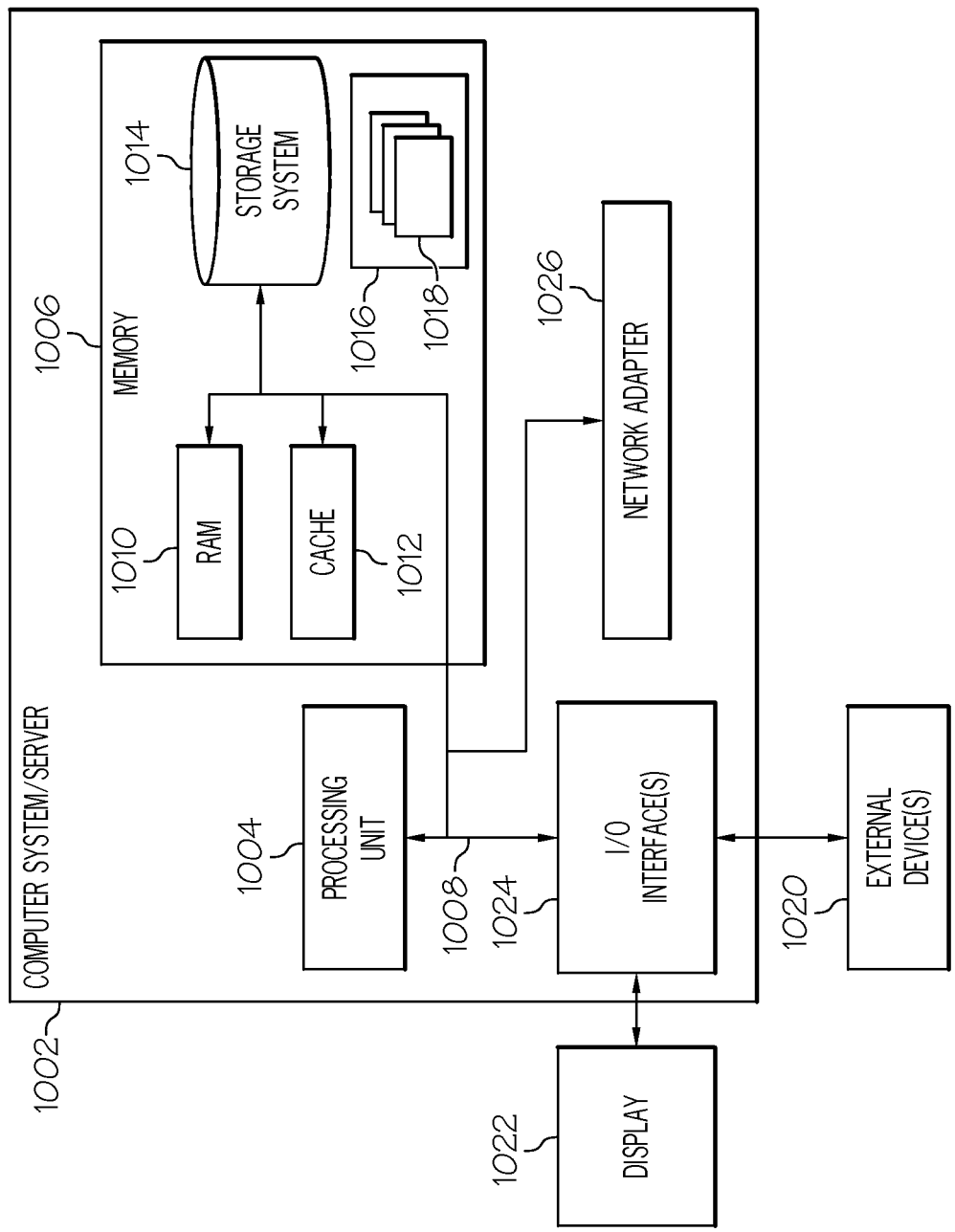
FIG. 10 is a block diagram illustrating one example of an information processing system discovering services in a service-oriented environment.

Referring now to FIG. 10, this figure is a block diagram illustrating an information processing system that can be utilized in embodiments of the present invention. The information processing system 1002 is based upon a suitably configured processing system adapted to implement one or more embodiments of the present invention (e.g., the server 218, 220 of FIG. 2). Any suitably configured processing system can be used as the information processing system 1000 in embodiments of the present invention. The components of the information processing system 1002 can include, but are not limited to, one or more processors or processing units 1004, a system memory 1006, and a bus 1008 that couples various system components including the system memory 1006 to the processor 1004.

The bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 10, the main memory 1006 includes the registry 234, the service directory 237 and services 238, the DSL 240 and service labels 252, the service label manager 244, and the discovery/matching manager 248. In another embodiment, the service label manager 244 and/or the discovery/matching manager 248 can reside within the processor 1004, or be a separate hardware component.

The system memory 1006 can also include computer system readable media in the form of volatile memory, such as random access memory (RAM) 1010 and/or cache memory 1012. The information processing system 1002 can further include other removable/non-removable, volatile/non-volatile computer system storage media. By way of example only, a storage system 1014 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1008 by one or more data media interfaces. The memory 1006 can include at least one program product having a set of program modules that are configured to carry out the functions of an embodiment of the present invention.

Program/utility 1016, having a set of program modules 1018, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. Program modules 1018 generally carry out the functions and/or methodologies of embodiments of the present invention.

The information processing system 1002 can also communicate with one or more external devices 1020 such as a keyboard, a pointing device, a display 1022, etc.; one or more devices that enable a user to interact with the information processing system 1002; and/or any devices (e.g., network card, modem, etc.) that enable computer system/server 1002 to communicate with one or more other computing devices. Such communication can occur via I/O interfaces 1024. Still yet, the information processing system 1002 can communicate with one or more networks such as a local area network (LAN), a general wide area network (WAN), and/or a public network (e.g., the Internet) via network adapter 1026. As depicted, the network adapter 1026 communicates with the other components of information processing system 1002 via the bus 1008. Other hardware and/or software components can also be used in conjunction with the information processing system 1002. Examples include, but are not limited to: microcode, device drivers, redundant processing units, external disk drive arrays, RAID systems, tape drives, and data archival storage systems.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program storage product for managing service labels for association with service specifications in a service-oriented environment, the computer program storage product comprising a non-transitory storage medium readable by a processing circuit and storing instructions for execution by the processing circuit for performing a method comprising:
   receiving at least one candidate service label from a user, wherein the candidate service label is currently free from association with a service specification and a specific service, where a service specification at least describes a functionality provided by a given service, and wherein the candidate service label comprises at least one of a service type and a set of service terms;
   sending, based on receiving the candidate service label, the candidate service label to a community of users;
   receiving, based on the sending, one of a vote for accepting the candidate service label and a vote for rejecting the candidate service label from each of a plurality of users in the community of users; and
   based on a number of votes being above a given threshold, one of
      storing the candidate service label as an accepted service label associated with the community of users, wherein the storing makes the candidate service label available for association with one or more service specifications; and
      rejecting the candidate service label.

2. The computer program storage product of claim 1, wherein the service type comprises a service type name and a description of a functionality provided by a service matching the service type.

3. The computer program storage product of claim 1, wherein the service type further comprises one or more input and output parameters associated with the service type.

4. The computer program storage product of claim 1, wherein each of the set of terms comprises an identifier and a definition associated with the term.

5. The computer program storage product of claim 1, wherein the candidate service label is sent to the community of users via a distributed consensus protocol.

6. The computer program storage product of claim 1, wherein the method further comprises:
   replicating the accepted service label in at least one information processing system that is different from an information process system on which the candidate service label has been stored.

7. The computer program storage product of claim 1, wherein the method further comprises:
   receiving, from a user, a first service specification of a requested service comprising the accepted service label;
   identifying, from a registry, at least a second service specification associated with an available service, wherein the second service specification comprises an accepted service label;
   comparing the accepted service label of the first service specification with the accepted service label of the second service specification;
   determining, based on the comparing, that the accepted service label of the first service specification matches the accepted service label of the second service specification; and
   based on the determining notifying, the user, from which the first service specification was received, of the available service.

8. A computer program storage product for matching service specifications in a service-oriented environment, the computer program storage product comprising a non-transitory storage medium readable by a processing circuit and storing instructions for execution by the processing circuit for performing a method comprising:
   analyzing a registry of service specifications;
   identifying, based on the analyzing, a first set of service specifications associated with requested services and a second set of service specifications associated with available services, wherein each of the first set of service specifications at least describes a requested functionality to be provided by a given service, and wherein each of the second set of service specifications at least describes a functionality provided by a given service,
   wherein each service specification in the first and second sets of service specifications comprises a service label, each service label having been selected for inclusion within the service specification from a plurality of service labels, and is reusable across a plurality of different service specifications, wherein each of the service labels comprises at least one of a service type and a set of service terms, the service type and the set of terms having been previously agreed upon by two or more users in a community of users for inclusion within the service label;
   comparing the service labels of the first set of service specifications with the service labels of the second set of service specifications; and identifying at least one service specification in the first set of service specifications that matches at least one service specification in the second set of service specifications based on comparing the services labels thereof.

9. The computer program storage product of claim 8, wherein the service type comprises a service type name and a description of a functionality provided by a service matching the service type.

10. The computer program storage product of claim 8, wherein the service type further comprises one or more input and output parameters associated with the service type.

11. The computer program storage product of claim of claim 8, wherein identifying at least one service specification in the first set of service specifications that matches at least one service specification in the second set of service specifications further comprises:
   determining, based on the comparing, that at least one of structural characteristics and syntactic characteristics of at least one of a service type name, a description, one or more input parameters in the service label of the at least one service specification in the first set of service specifications matches at least one of structural characteristics and syntactic characteristics of at least one of a service type name, a description, and one or more input parameters, respectively, in the service label of the at least one service specification in the second set of service specifications.

12. The computer program storage product of claim 8, wherein the information within each of the service labels has been previously agreed upon by two or more users in a community of users using a distributed consensus protocol.

13. The computer program storage product of claim 8, wherein each of the set of terms comprises an identifier and a definition associated with the term.

14. The computer program storage product of claim 13, wherein the identifier is a text string.

15. The computer program storage product of claim of claim 13, wherein identifying at least one service specification in the first set of service specifications that matches at least one service specification in the second set of service specifications further comprises:
   determining, based on the comparing, that at least one of the identifier and the definition in the service label of the at least one service specification in the first set of service specifications matches at least one of the identifier and the definition, respectively, in the service label of the at least one service specification in the second set of service specifications.

16. A computer program storage product for discovering services in a service-oriented environment, the computer program storage product comprising a non-transitory storage medium readable by a processing circuit and storing instructions for execution by the processing circuit for performing a method comprising:
   receiving, from a user in a community of users, a request for a service, wherein the request comprises a first service specification, the first service specification at least describing a requested functionality to be provided by a service, the first service specification comprising a first service label, wherein the first service label comprises at least one of a service type and a set of service terms, the first service label having been selected from a plurality of service labels for inclusion within the first service specification and is reusable across a plurality of different service specifications;
   identifying, from a registry of service specifications, at least a second service specification, the second service specification at least describing a functionality provided by a given service associated with at least one available service associated with the second service specification, the second service specification comprising a second service label, wherein the second service label comprises at least one of a service type and a set of service terms,
   wherein each of the at least one of a service type and a set of service terms within each of the first and second service labels has been previously agreed upon by two or more users in the community of users for inclusion within the first and second service labels, respectively;
   comparing the first service label with the second service label;
   determining, based on the comparing, that the first service label matches the second service label; and
   satisfying, based on the determining, the request with the available service associated with the second service specification.

17. The computer program storage product of claim 16, wherein the service type comprises a service type name and a description of a functionality provided by a service matching the service type.

18. The computer program storage product of claim 16, wherein the service type further comprises one or more input and output parameters associated with the service type.

19. The computer program storage product of claim of claim 16, wherein determining that the first service label matches the second service label further comprises:
   determining, based on the comparing, that at least one of structural characteristics and syntactic characteristics of at least one of a service type name, a description, and one or more input parameters in the first service label matches at least one of structural characteristics and syntactic characteristics of at least one of a service type name, a description, and one or more input parameters, respectively, in the second service label.

20. The computer program storage product of claim of claim 16, wherein determining that the first service label matches the second service label further comprises:
   determining, based on the comparing, that at least one of the identifier and the definition in the first service label matches at least one of the identifier and the definition, respectively, in the second service label.

21. The computer program storage product of claim 16, wherein the information within each of the service labels has been previously agreed upon by two or more users in a community of users using a distributed consensus protocol.

22. The computer program storage product of claim 16, wherein each of the set of terms comprises an identifier and a definition associated with the term.

23. The computer program storage product of claim 22, wherein the identifier is a text string.

24. A system for managing service labels for association with service specifications in a service-oriented environment, the system comprising:
   a memory;
   a processor; and
   a service label manager communicatively coupled to the memory and the processor, wherein the service label is configured to perform a method comprising:
      receiving at least one candidate service label from a user, wherein the candidate service label is currently free from association with a service specification and a specific service, where a service specification at least describes a functionality provided by a given service, and wherein the candidate service label comprises at least one of a service type and a set of service terms;

sending, based on receiving the candidate service label, the candidate service label to a community of users;

receiving, based on the sending, one of a vote for accepting the candidate service label and a vote for rejecting the candidate service label from each of a plurality of users in the community of users, wherein the storing makes the candidate service label available for association with one or more service specifications; and based on a number of votes being above a given threshold, one of storing the candidate service label as an accepted service label associated with the community of users; and rejecting the candidate service label.

* * * * *